United States Patent Office 2,956,648
Patented Oct. 18, 1960

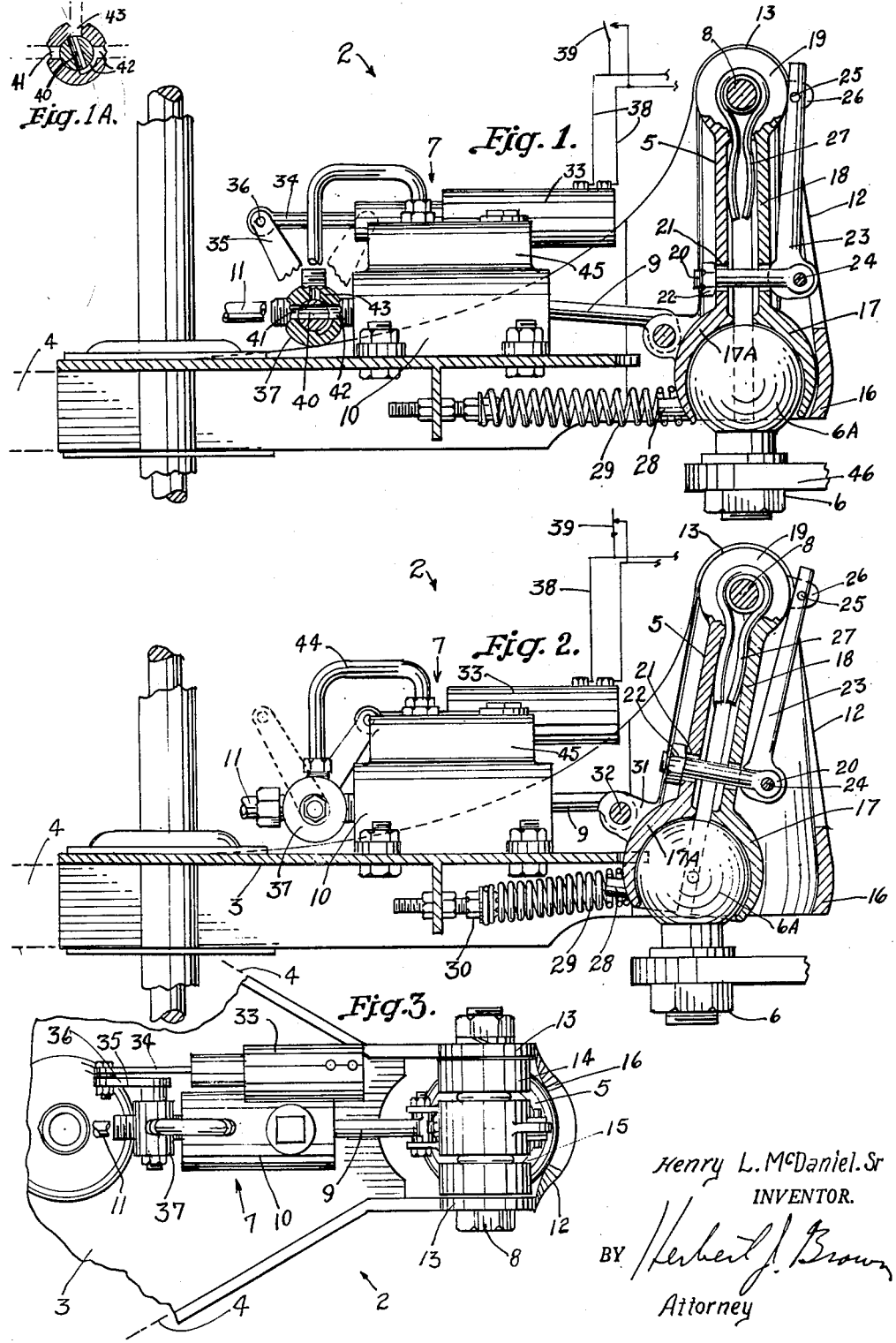

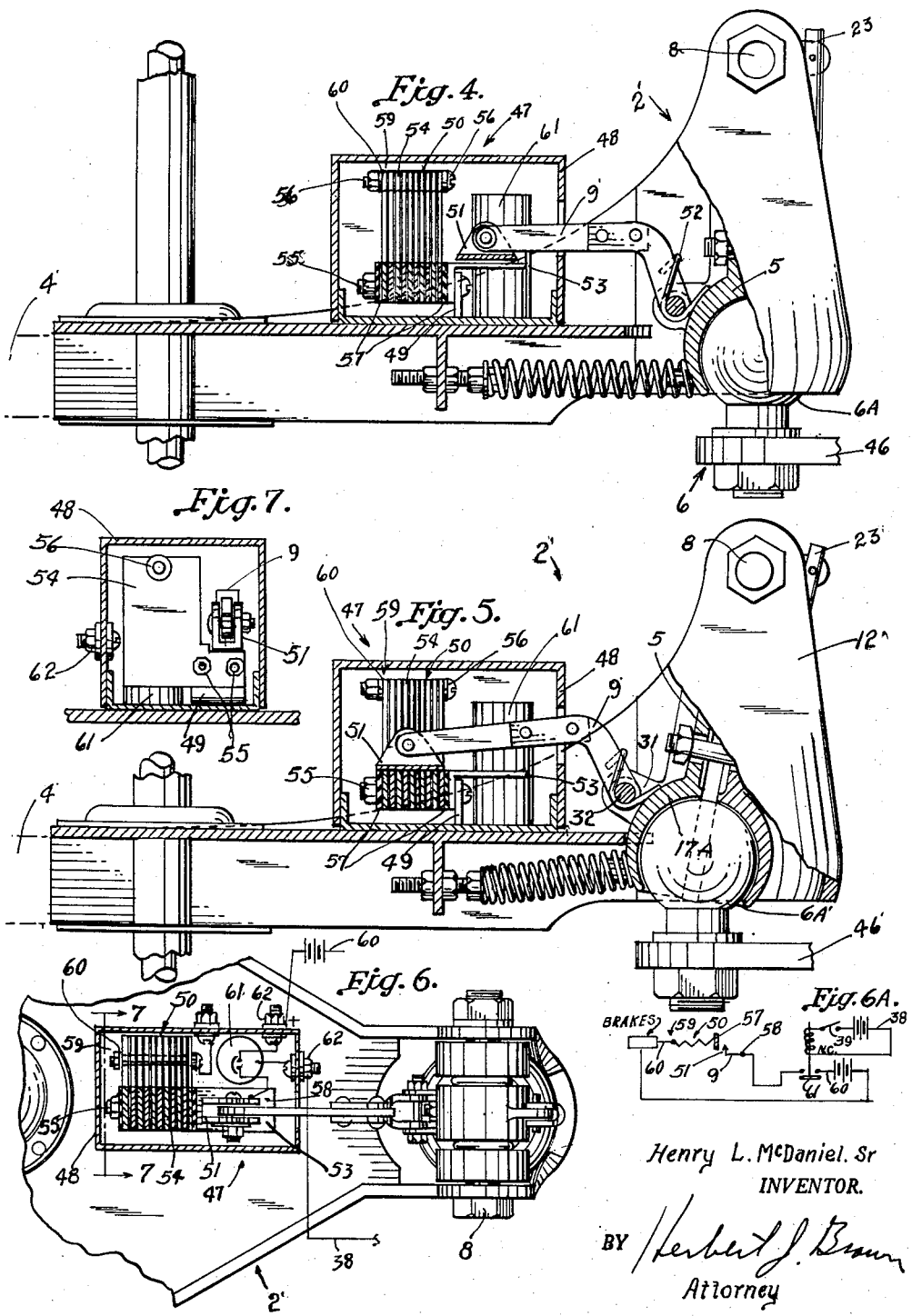

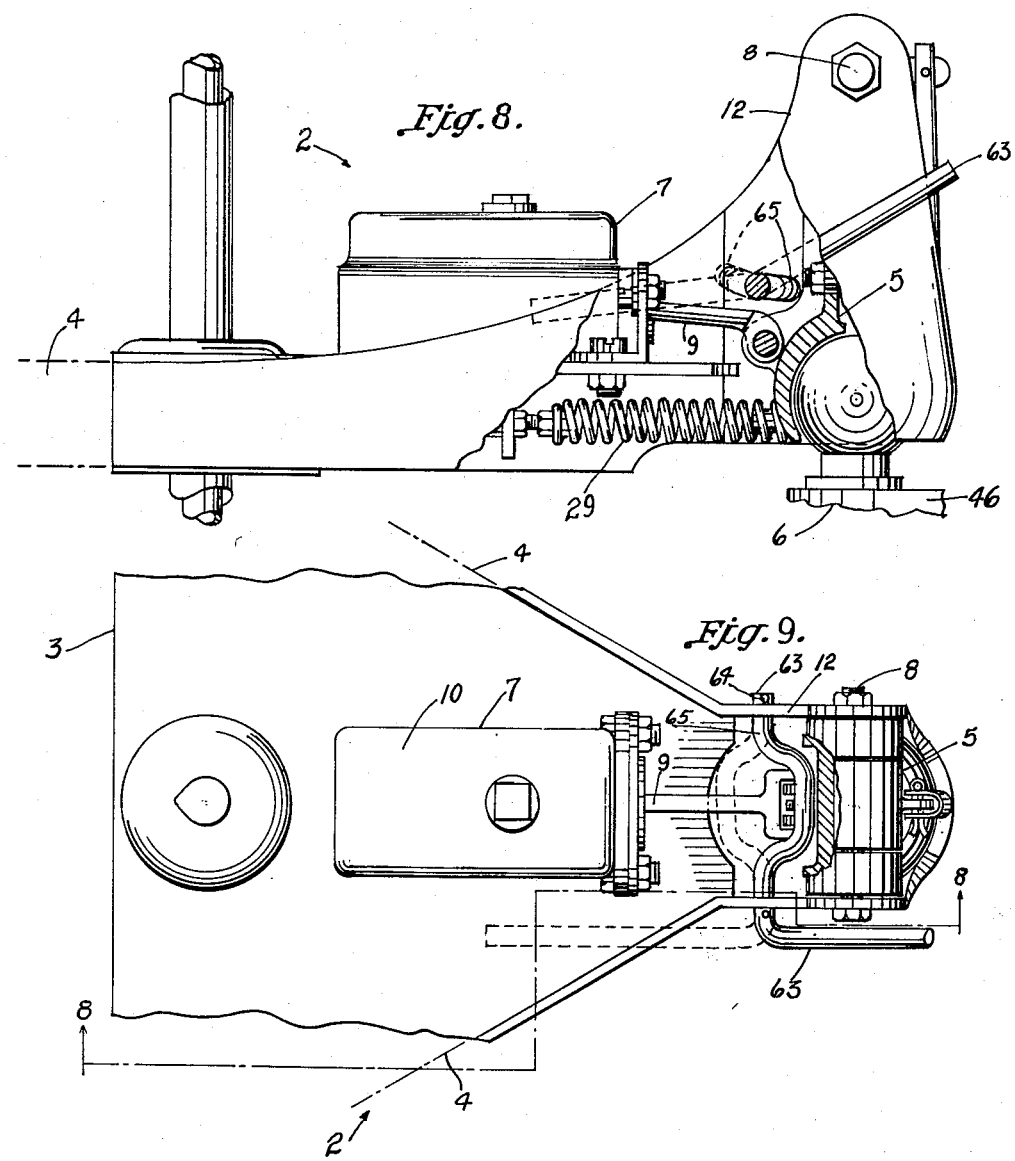

2,956,648

TRAILER BRAKE

Henry L. McDaniel, Sr., Star Rte. W., Azle, Tex.

Filed Aug. 7, 1957, Ser. No. 676,758

3 Claims. (Cl. 188—112)

This invention relates generally to automotive equipment and more specifically to that type of accessory known as a trailer hitch.

The primary object of this invention is to provide a trailer hitch assembly between a towing and a towed vehicle, which assembly includes means for automatically controlling the brakes of the towed vehicle.

Another object is to provide a brake control device for a trailer in which the trailer brakes are automatically and smoothly applied or released in proportion to the braking action of the towing vehicle to thus eliminate relative surging or jerking between the two vehicles.

And another object is to provide a trailer wheel brake control unit which is self-contained and does not require direct power from the towing vehicle and thus leave the driver's hands and feet free for full control of the steering wheel, foot brakes, etc., for added safety of operation.

An additional object is to provide a trailer wheel brake control unit which forms an integral part of the trailer hitch assembly between the trailer and a towing vehicle, and which brake unit functions on the momentum of the towing vehicle.

A further object is to provide a trailer brake control means for power brakes which may employ either air pressure, air vacuum, hydraulic fluid, or electricity as the brake operating medium.

A still further object is to provide a trailer hitch assembly including an electrical brake control means which depends on the momentum of the towed vehicle and which hitch assembly may be installed interchangeably with conventional hitch assemblies without requiring any change in the existing electrical system of the towing vehicle, but with the addition of a simple connection to the stop light circuit of the towing vehicle.

And another object is to provide a safety circuit in an electrical trailer brake control unit whereby the driver may engage the trailer brakes even though the towing vehicle brakes fail to operate, and conversely he may deliberately prevent the operation of the trailer brakes as may be desirable when the vehicle is traveling down hill or backing up.

And yet another object is to provide a trailer hitch assembly including a trailer brake control means which is sturdy and rugged in construction, dependable in operation, and yet economical to manufacture.

These and other objects and advantages will become apparent from an examination of the following specification and drawing in which:

Figure 1 represents a side elevational view partly in cross section of one embodiment of the trailer hitch assembly of this invention in its normal travel position.

Figure 1A shows the bypass valve of Figure 1 in its actuated position.

Figure 2 is a view similar to Figure 1 but showing the hitch assembly in its operating position of applying power to the trailer brakes.

Figure 3 is a top plan view of the device shown in Figure 1.

Figure 4 is a side elevational view partly in cross-section of another embodiment of this invention in its normal travel position.

Figure 5 is a view similar to Figure 4 but showing the operating position of this device.

Figure 6 is a top plan view of the device shown in Figure 4.

Figure 6A is a wiring diagram for use with the form of the invention shown in Figures 4–7.

Figure 7 is a cross-sectional view taken along the lines 7—7 of Figure 6.

Figure 8 is a side elevational view in fragmentary cross-section showing an additional safety feature which forms an optional part of this invention.

Figure 9 is a top plan view of the device shown in Figure 8.

Referring now more particularly to the characters of reference on the drawing it will be observed in Figure 1 that the trailer hitch assembly indicated generally at 2 consists basically of a frame 3 attached to a trailer tongue 4 and a pivoted socket arm 5 for engaging a ball hitch 6 on the towing vehicle, and a brake control means 7 which is activated by the arm 5. When the driver of the vehicle on which assembly 2 is employed applies his brakes in the towing vehicle it slows down, and the trailer due to its own momentum tends to continue in a forward direction at the same rate of speed and frame 3 moves forward past the vertical centerline of ball hitch 6 and causes arm 5 to pivot thereabout at its lower end and to pivot about a pivot bolt 8 at its upper end so that the rearwardly extending piston arm 9 will pressurize brake fluid in piston cylinder 10 and in brake line 11 to thereby apply the trailer brakes (not shown).

Examining the parts in detail it is seen that the frame 3 includes an upstanding hood-shaped structure 12 having a pair of ears 13 through which pivot bolt 8 extends to secure spacers 14, arm 5, and washers 15 in close turning relation. The forward section of structure 12 is open down to a lower positioned retainer 16 which is curved to the general shape of a cup to engage the outer surface of socket 17 of arm 5 which engages ball hitch 6. Socket 17 is made up of two halves, each of which is integral with a side member 18 which are integral with a top eye piece 19 so that the socket halves are free to expand or contract relative to the top eye piece 19 for insertion or removal over ball hitch 6. An eyebolt 20 extends through aligned holes 21 of side members 18 and is adapted to bind socket halves 17A about ball 6A by the combination of a nut 22 at one end and a cam arm 23 at the other end. Cam arm 23 is pivoted about pin 24 which passes through eyebolt 20. When the cam arm 23 has been moved to a position to thus bind the ball 6A and socket halves 17A into a sliding engagement, it is locked in place by pin 25 which engages both the arm 23 and ears 26. Upon removal of pin 25, arm 23 may be moved downward and release the cam pressure from side members 18 whereupon they are free to expand under the action of their internal spring 27 a sufficient distance to permit installation of arm 5 onto or its removal from ball 6A.

The rearward socket half 17A includes a spring anchor lug 28 which retains one end of compression spring 29, and an adjustable anchor bolt 30 attached to frame 3 retains the other end of spring 29. By this arrangement the actuation of brake control means 7 will be limited to occasions where a substantial force is present and the actuation will be diminished.

An eye lug 31 on rearward socket half 17A is pivoted by pin 32 to piston arm 9 and piston arm 9 is pivoted in turn to its piston (not shown) in cylinder 10. A solenoid 33 is attached to the top side of cylinder 10 with its plunger 34 operatively attached to valve lever 35 by a pivot bolt 36. Valve lever 35 operates a rotary valve 37 from its normally open position (Fig. 1) to its bypass position (Fig. 1A) when the solenoid 33 is energized through electrical leads 38 which may be connected to the automotive back-up light circuit so that the valve 37 will be automatically moved to its bypass position and the trailer brakes will not engage when the driver wishes to back up the vehicle-trailer combination. Leads 38 may also be connected in parallel to a manual switch 39 so that the driver may prevent the trailer brakes from engaging as may be desirable when the vehicle-trailer is traveling down hill and the driver wishes to control to coasting speed by his foot brakes or through use of the transmission. When the valve 37 is in its normal position and solenoid 33 is not energized, the valve channel 40 is approximately horizontal and brake fluid may pass directly to or from the brakes through brake port 41 and line 11, but upon energization of solenoid 33, the valve channel 40 is moved to the position shown in Figure 1A and port 41 is closed off and a passage is provided from the extended portion of cylinder port 42 to the bypass port 43 from which the fluid is directed by tubing 44 back into the upper reservoir 45 of cylinder 10 to be subsequently returned to the operating portion of the cylinder through a check valve (not shown) in a well known manner. When the towing vehicle, indicated by frame member 46, increases its speed or returns to its normal straight line towing speed, the trailer hitch assembly re-assumes the position shown in Fig. 1.

The embodiment, identified at 2' in Figures 4–7, is for use with electrically operated trailer brakes. The structure 12', frame 3', socket arm 5', spring 29', cam arm 23' and parts associated with the named parts all correspond to and are substantially identical to the parts shown and described in the embodiment 2. The brake control means 47, however, is entirely electrical and consequently considerably distinct from the fluid control means 7 of the first described assembly.

The brake control means 47 includes basically a housing 48, a frame 49 within the housing for supporting a rheostat 50, a sliding contact 51 which is pivoted to one end of arm 9'; the other end of arm 9' is pivoted to ears 31' on socket half 17A' by means of pin 32'. A spring 52 acts between socket half 17A' and arm 9' to keep contact 51 in engagement with its guide angle 53 and rheostat plates 54. Angle 53 is attached to frame 49 by means of a bolt 55 which extends completely through the stack of plates 54. The L-shaped plates 54 must either be insulated from bolts 55 and 56 or the bolts themselves must be made of nylon or other insulating material. The guide angle 53 and frame 49 are insulated from the plates 54 by spacers 57 so that electric current coming in at terminal 58 of sliding contact 51 must pass through the resistance of each of the plates 54 between it and the output terminal 59, so that the voltage delivered at terminal 59 and out through brake lead 60 is proportional to the rearward distance that contact 51 has traveled which, in turn, is proportional to the degree to which the velocity of the trailer exceeds the velocity of the towing vehicle. Control means 47 also includes a solenoid switch 61 which is normally closed so that the circuit 60 may be completed through the sliding contact and rheostat arrangement just described.

However, on occasions when it is desirable to not have the trailer brakes applied automatically (as when the vehicle combination is backing up) the driver may simply close manual switch 39' as previously described and solenoid switch 61 will then open and de-energized circuit 60 and consequently release the brakes. Insulated terminal screws 62 permit leads 60 and 38' to pass through the housing 48 to complete their electrical connections. With the rheostat 50 in the position shown, the circuit 60 is employed to operate electrically applied, spring released brakes, and by moving the rheostat 50 to the right of contact 51 instead of to the left as shown, the circuit 60 may be employed with equal facility to operate spring applied, electrically released brakes.

Figures 8 and 9 show a mechanical trailer brake release device which may be employed in place of the solenoid 33 in Figures 1–3. In this device, a generally L-shaped lever 63 is pivoted through the side walls of structure 12 and retained in this position by pins 64 so that any movement on the free end of lever 63 will cause rotation on the offset section 65 which is included within the side walls of structure 12. When the offset section 65 is rotated to its brake locking position, shown in solid lines in Figure 9, the swinging socket arm 5 is locked against any relative pivoting movement with structure 12 and hence cannot impart any rearward braking movement to piston arm 9.

The invention is not limited to the constructions herein shown and described, but may be made in various ways within the scope of the appended claims.

What is claimed is:

1. A trailer hitch assembly for insertion between a vehicle and a trailer having brakes and a forwardly directed tongue, said trailer hitch assembly comprising: an upwardly directed ball hitch on and extending from the rear of said vehicle, a frame on the forward end of said tongue, said frame including an opening receiving said ball hitch therein, the forward portion of said opening providing a retainer for said ball hitch when said trailer is being towed, upstanding ears on said frame on opposite sides of said opening, a socket arm, the socket end of which engages said ball hitch and the remaining end of which is pivotally engaged between the upper ends of said ears, a brake control supported by said tongue, an actuating arm pivotally connected with said socket arm and operatively connected with said brake control, and means connecting said brake control with the brakes of said trailer.

2. In a trailer hitch assembly as defined in claim 1, the construction wherein said socket arm is comprised of forward and rearward halves, and means disengageably securing said halves on said ball hitch.

3. In a trailer hitch as defined in claim 1, the construction including means deactivating said brake control.

References Cited in the file of this patent

UNITED STATES PATENTS

| | | |
|---|---|---|
| 2,135,097 | Billingsley | Nov. 1, 1938 |
| 2,320,585 | Gill | June 1, 1943 |
| 2,341,965 | Wagner | Feb. 15, 1944 |
| 2,693,251 | Hall | Nov. 2, 1954 |
| 2,729,309 | Mullin | Jan. 3, 1956 |